United States Patent [19] [11] 4,260,672
Sasaki et al. [45] Apr. 7, 1981

[54] ELECTROPHOTOGRAPHIC SENSITIVE ELEMENT HAVING A PHOTOCONDUCTIVE DISAZO PIGMENT

[75] Inventors: Masaomi Sasaki, Kawasaki; Kiyoshi Sakai, Tokyo; Mitsuru Hashimoto, Hino; Masafumi Ohta, Yokohama; Kyoji Tsutsui, Tokyo, all of Japan

[73] Assignee: Ricoh Company, Ltd., Tokyo, Japan

[21] Appl. No.: 922,526

[22] Filed: Jul. 7, 1978

[30] Foreign Application Priority Data

Jul. 8, 1977 [JP] Japan ................................. 52/81790

[51] Int. Cl.$^3$ ............................................. G03G 5/06
[52] U.S. Cl. ......................................... 430/72; 430/78; 430/58
[58] Field of Search ................. 430/72, 76, 77, 78, 430/58

[56] References Cited

U.S. PATENT DOCUMENTS

| | | | |
|---|---|---|---|
| 3,583,869 | 6/1971 | Tubuko | 96/1.5 C |
| 3,681,066 | 8/1972 | McGuckin | 96/1.5 R |
| 4,026,704 | 5/1977 | Rocblitz | 96/1.5 |
| 4,047,944 | 9/1977 | Rossi et al. | 96/1.6 |
| 4,051,123 | 9/1977 | Philler et al. | 96/1.6 |
| 4,052,210 | 10/1977 | Hectors | 96/1.5 |
| 4,105,446 | 8/1978 | Pu | 96/1.5 R |
| 4,123,270 | 10/1978 | Heil et al. | 96/1.6 |

*Primary Examiner*—Edward C. Kimlin
*Assistant Examiner*—John L. Goodrow
*Attorney, Agent, or Firm*—Blanchard, Flynn, Thiel, Boutell & Tanis

[57] ABSTRACT

The present invention provides an electrophotographic element of a high sensitivity and a high flexibility comprising an electroconductive support and a photosensitive layer provided thereon and containing as an effective ingredient therein a disazo compound represented by the following general formula:

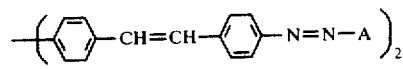

wherein A is a radical selected from the group consisting of:

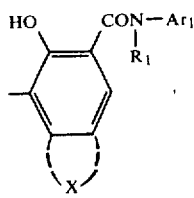

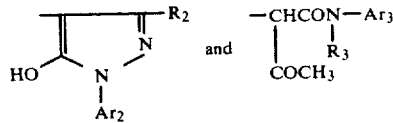

in which X represents a ring selected from the group consisting of aromatic rings such as benzene ring and naphthalene ring, hetero rings such as indole ring, carbazole ring and benzofuran ring, and substituted derivatives thereof; $Ar_1$ represents a radical selected from the group consisting of aromatic rings such as benzene ring and naphthalene ring, hetero rings such as dibenzofuran ring and substituted derivatives thereof; $Ar_2$ and $Ar_3$ represent radicals respectively selected from the group consisting of aromatic rings such as benzene ring and naphthalene ring, and substituted derivatives thereof; $R_1$ and $R_3$ represent radicals respectively selected from the group consisting of hydrogen atom, lower alkyl radicals and phenyl radical and substituted derivatives thereof; and $R_2$ represents a radical selected from the group consisting of lower alkyl radicals, and carboxyl radical and esters thereof.

16 Claims, 4 Drawing Figures

ELECTROPHOTOGRAPHIC SENSITIVE ELEMENT HAVING A PHOTOCONDUCTIVE DISAZO PIGMENT

BACKGROUND OF THE INVENTION (a) Field of the Invention

The present invention relates to a photosensitive element for use in electrophotography, and more particularly to a novel photosensitive element provided with a photosensitive layer comprising a disazo compound as an effective ingredient thereof.

(b) Description of the Prior Art

In the field of an electrophotographic sensitive element provided with a conductive support and a photosensitive layer provided thereon and containing an azo compound as an effective ingredient thereof, there is already known for example the use of monoazo compounds (disclosed in Japanese Patent Publication No. 16474/1969) or of benzidine disazo compounds (disclosed in the U.S. Pat. Nos. 3,898,048 and 4,052,210). Although such azo compounds are certainly useful as the effective ingredient in the photosensitive layer, in fact there are still not known compounds which sufficiently satisfy various requirements imposed on the photosensitive element by the electrophotographic process. It is therefore important to provide a wide selection of compounds, not necessarily limited to azo compounds, adapted for use as the effective ingredient, and in this manner it is rendered possible to provide a photosensitive element most suitable for a particular process. Thus, in the field of electrophotography, it is desirable that as many varieties of compounds as possible are available as the effective ingredient for the photosensitive element.

SUMMARY OF THE INVENTION

A primary object of the present invention is to provide an electrophotographic sensitive element containing a novel disazo compound capable of functioning as an effective ingredient in various electrophotographic processes.

A secondary object of the present invention is to provide an electrophotographic sensitive element affording a wide selection of disazo compounds capable of functioning as the effective ingredient.

A third object of the present invention is to provide a novel electrophotographic sensitive element of a high sensitivity and a high flexibility containing such disazo compound as mentioned above.

As the result of syntheses of a series of disazo compounds and investigation on the application thereof in the photosensitive element, the present inventors have found that the disazo compounds provided with a structure represented by the following general formula are capable of functioning as an excellent effective ingredient in the photosensitive element and have thus achieved the present invention.

More specifically the present invention provides an electrophotographic sensitive element comprising, on a conductive support, a photosensitive layer containing as an effective ingredient thereof a disazo compound represented by the following formula:

wherein A represents a radical selected from the group consisting of:

in which X represents a ring selected from the group consisting of aromatic rings such as benzene ring or naphthalene ring, hetero rings such as indole ring, carbazole ring or benzofuran ring and substituted derivatives thereof; $Ar_1$ represents a radical selected from the group consisting of aromatic rings such as benzene ring and naphthalene ring, hetero rings such as dibenzofuran ring and substituted derivatives thereof; $Ar_2$ and $Ar_3$ represent radicals respectively selected from the group consisting of aromatic rings such as benzene ring and naphthalene ring and substituted derivatives thereof; $R_1$ and $R_3$ represent radicals respectively selected from the group consisting of hydrogen atom, lower alkyl radicals and phenyl radical and substituted derivatives thereof; and $R_2$ represents a radical selected from the group consisting of lower alkyl radicals, carboxyl radical and esters thereof.

In the following there will be shown examples of the structures of the compounds of the above-mentioned general formula as employed in the present invention:

Compound No. 1

In the following compounds Nos. 2–66, the portion:

commonly contained therein is represented simply by —Y—.

2

3

4

5

6

7

8

9

-continued

10

11

12

13

14

15

16

17

-continued

52

53

54

55

56

57

58

59

60

61

62

63

64

65

66

These disazo compounds can be easily prepared from 4,4'-bis(p-nitrostyryl)biphenyl by reducing and diazotizing said compound to obtain a tetrazonium salt which is isolated and subsequently coupled with a coupler, such as naphthol AS, corresponding to said disazo compound in a suitable organic solvent such as N,N-dimethylformamide and in the presence of alkali. For instance the aforementioned compound No. 1 can be prepared by the following process, and other disazo compounds can also be prepared in a similar manner from corresponding starting materials.

SYNTHESIS EXAMPLE 30.5 gr. of 4,4'-bis(p-aminostyryl)biphenyl was added into dilute hydrochloric acid prepared from 140 ml. of concentrated hydrochloric acid and 140 ml. of water, and well agitated for about 30 minutes at about 60° C. Successively the obtained mixture was cooled to about 0° C., and a solution of 11.2 gr. of sodium nitrite in 17 ml. of water was dropwise added during about 30 minutes at 0° to 5° C. The mixture was agitated for about 30 minutes at the same temperature, and, after addition of 100 ml. of water, filtered off to eliminate a small quantity of unreacted substances. The filtrate was poured into 120 ml. of fluoroboric acid, and the separating crystals were collected by filtration, washed with water and dried to obtain 34.5 gr. (yield 75%) of tetrazonium difluoroborate as yellow crystals. Decomposition point is about 130° C.

Successively 29.3 gr. of the thus obtained tetrazonium salt and 26.3 gr. of 2-hydroxy-3-naphthoic anilide as a coupler were dissolved in 4250 ml. of cooled N,N-dimethylformamide, and a solution consisting of 41 gr. of sodium acetate and 600 ml. of water was added dropwise during 1 hr. at 4° to 8° C. Then the mixture was agitated for about 3 hrs. at room temperature. Subsequently the obtained precipitate was collected by filtration, washed three times with 2 litres of water, then washed eight times with 2 litres of N,N-dimethylformamide and washed with acetone to remove the remaining N,N-dimethylformamide thereby obtaining violet crystals which were dried at 70° C. under a reduced pressure of 2 mmHg to obtain 41.2 gr. (yield 88%) of the disazo compound No. 1. Melting point is higher than 300° C.

Elementary analysis

|  | Calcd. ($C_{62}H_{44}N_6O_4$) | Obsd. |
| --- | --- | --- |
| C (%) | 79.46 | 79.85 |
| H (%) | 4.74 | 4.80 |
| N (%) | 8.97 | 8.99 |

IR absorption (KBr tablet): 1680 $cm^{-1}$ (secondary amine)

Figure 1:
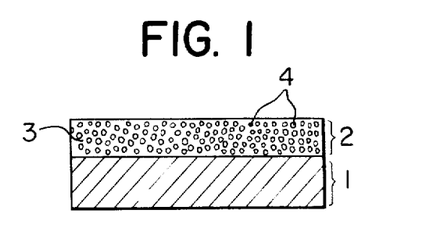
FIGS. 1 to 4 are enlarged cross-sectional views of the photosensitive elements embodying the present invention.
Figure 2:
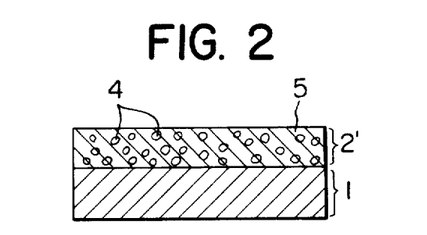
Figure 3:
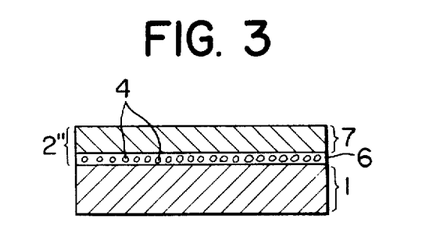
Figure 4:
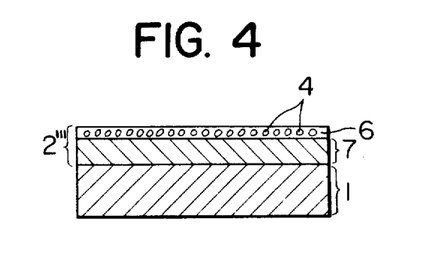

The photosensitive element of the present invention, containing the aforementioned disazo compounds, may assume the forms shown in FIGS. 1-4 according to the method of use of said compounds. In FIG. 1, the photosensitive element is composed of a conductive support 1 and a photosensitive layer 2 provided thereon and consisting of a system of a resinous binder 3 and a disazo compound 4 which is used as a photoconductive material in this case. In FIG. 2, the photosensitive element is composed of a conductive support 1 and a photosensitive layer 2' provided thereon and consisting of a system of a disazo compound 4, which is employed as a charge carrier generating material in this case, and a charge transfer medium 5, which is a mixture of a charge transfer material and a resinous binder. FIGS. 3 and 4 show variations of the photosensitive element shown in FIG. 2, wherein the photosensitive layer 2" or 2''' is composed of a charge carrier generating layer 6 principally consisting of a disazo compound 4, and a layer 7 of a charge transfer medium.

In the photosensitive element shown in FIG. 1, the disazo compound functions as a photoconductive material, and the generation and transfer of charge carriers necessary for light-decay are conducted through the compound particles. In case of the photosensitive element shown in FIG. 2, the charge transfer material forms, together with a binder which is eventually used with a plasticizer, a charge transfer medium, while the disazo compound functions as a charge carrier generating material. Said charge transfer medium has no ability to develop charge carriers as in the case of disazo compounds, but is capable of accepting and transferring the charge carriers generated by said compounds. Thus, in the photosensitive element shown in FIG. 2, the formation of charge carriers necessary for high-decay is performed by the disazo compound, while the transfer of said carriers is principally performed by the charge transfer medium. Another basic requirement for the charge transfer medium is that the absorption wavelength range thereof does not overlap that of the disazo compound which principally lies in the visible wavelength range, since the light has to reach the surface of compound particles without absorption for achieving an efficient charge carrier generation in the disazo compound. This requirement is not applicable, however, in the case of a photosensitive element having a sensitivity for a particular wavelength. Thus, in such case, the charge transfer medium and the disazo compound are acceptable as long as the absorption wavelength regions thereof do not completely overlap each other. In the case of the photosensitive element shown in FIG. 3, the light passing through the layer of charge transfer medium reaches the charge carrier generating layer to perform the generation of charge carriers by the disazo compound contained therein, while the charge transfer medium layer, receiving the injected charge carriers, performs the transfer thereof, so that the mechanism of generating the charge carriers by the disazo compound and transferring said charge carriers by the charge carrier medium is the same as in the photosensitive element shown in FIG. 2. Thus the disazo compound functions, also in this case, as a material for generating charge carriers. Further, the mechanisms and functions of both the charge transfer medium layer and the charge transfer generating layer in the photosensitive element of FIG. 4 are the same as those of the photosensitive element shown in FIG. 3.

The photosensitive element of FIG. 1 can be prepared by coating a conductive support with a dispersion of fine particles of a disazo compound dispersed in a binder solution. The photosensitive element of FIG. 2 can be prepared by coating a conductive support with a dispersion of fine particles of a disazo compound dispersed in a solution dissolved a charge transfer material and a binder. Also the photosensitive element of FIG. 3 can be prepared by vacuum evaporating a disazo compound or by coating and drying a dispersion of fine particles of disazo particles dispersed in a suitable solvent, which contains eventually a binder dissolved therein, on a conductive support, then finishing the surface or adjusting the thickness of the thus obtained coating, if necessary, for example by buff polishing, and coating and drying thereon a solution containing a charge transfer material and a binder. The photosensitive element shown in FIG. 4 can be prepared by inverting the order of application of the layers in the process of preparing the element shown in FIG. 3. In either case, the disazo compound employed in the present invention is crushed to a particle size of 5$\mu$ or less, preferably 2$\mu$ or less, by means of, for example, a ball mill. The coating can be achieved by ordinary means, for example a doctor blade or a wired bar. The thickness of photosensitive layer, in case of FIGS. 1 and 2, is in the range of about 3 to 50$\mu$, preferably in the range of about 5 to 20$\mu$. In case of FIGS. 3 and 4, the charge carrier generating layer is of a thickness of 5$\mu$ or less, preferably 2$\mu$ or less, while the charge transfer medium layer is of a thickness in the range of about 3 to 50$\mu$, preferably 5 to 20μ. In the photosensitive element of FIG. 1, the disazo compound is employed in an amount of 30 to 70 wt.%, preferably about 50 wt.%, with respect to the photosensitive layer. In the photosensitive element of FIG. 1, the particles of disazo compound are preferably mutually contacting from the surface of photosensitive layer to the surface of support, since, as explained in the foregoing, the particles of disazo compound function as the photoconductive material to perform the generation and transfer of charge carrier necessary for photodissipation therethrough. For this reason the presence of disazo compound in a relatively high proportion in the photosensitive layer is preferred, but a proportion of about 50 wt.% is appropriate in consideration of strength and sensitivity of the photosensitive layer. In the photosensitive element shown in FIG. 2, the proportion of disazo compound in the photosensitive layer is in the range of 1 to 50 wt.%, preferably 1 to 20 wt.%, while that of charge transfer material is in the range of 10 to 95 wt.%, preferably 30 to 90 wt.%. Also in the photosensitive element shown in FIG. 3 or 4, the proportion of charge transfer material in the charge transfer medium layer is, as in the photosensitive layer in FIG. 2, in the range of 10 to 95 wt.%, preferably 30 to 90 wt.%. In the preparation of the photosensitive elements shown in FIGS. 1 to 4, a suitable plasticizer may be employed in combination with a binder.

In the photosensitive element of the present invention, the conductive support is composed of a metal plate or foil such as aluminum, a plastic film on which a metal, for example aluminum, is deposited, or a paper sheet subjected to conductive treatment. The binders can be composed for example of polycondensate resins such as polyamide, polyurethane, polyester, epoxy resin, polyketone or polycarbonate, vinylic polymers such as polyvinylketone, polystyrene, poly-N-vinylcarbazole or polyacrylamide, or any other adhesive insulating resins. Examples of usable plasticizers are halogenated paraffin, polychlorinated biphenyl, dimethylnaphthalene, dibutylphthalate etc. The examples of charge transfer materials of high molecular weight are vinylic polymers such as poly-N-vinylcarbazole, halogenated poly-N-vinylcarbazole, polyvinylpyrene, polyvinylindoquinoxaline, polyvinyldibenzothiophene, polyvinylanthracene, polyvinylacridine etc., and polycondensate resins such as pyrene-formaldehyde resin, bromopyrene-formaldehyde resin, ethylcarbazole-formaldehyde resin, chloroethylcarbazole-formaldehyde resin etc., while those of low molecular weight (monomers) are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiophene-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrodibenzothiophene-5,5-dioxide, 3-nitrodibenzothiophene-5,5-dioxide, 3,7-dinitrodibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxonthone, 2,4,7-trinitro-9,10-phenanthrenequinone, 1,4-naphthoquinonebenzo[a]anthracene-7,12-dione, 2,4,7-trinitro-9-dicyanomethylenefluorene, tetrachlorophthalic anhydride, 1-bromopyrene, 1-methylpyrene, 1-ethylpyrene, 1-acetylpyrene, carbazole, N-ethylcarbazole, N-β-chloroethylcarbazole, N-β-hydroxyethylcarbazole, 2-phenylindole, 2-phenylnaphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyloxazole, triphenylamine, tris(4-diethylaminophenyl)methane, 3,6-bis(dibenzylamino)-9-ethylcarbazole etc. The above-mentioned charge transfer materials may be employed singly or in a mixture of two or more materials.

The photosensitive elements obtainable in the above-mentioned manner may be further provided, if necessary, with an adhesive or barrier layer between the conductive support and the photosensitive layer, said barrier layer being preferably composed of polyamide, nitrocellulose, aluminum oxide etc. and being preferably of a thickness of 1μ or less.

The photosensitive element of the present invention can be utilized in the copying process by subjecting the surface of photosensitive layer to electrostatic charging, imagewise exposure, image development and, if necessary, transfer for example onto paper.

The photosensitive element of the present invention is advantageous in that it is generally of a high sensitivity and a high flexibility. Now the present invention will be further clarified by the following examples.

DESCRIPTION OF THE PREFERRED EMBODIMENTS

EXAMPLE 1

1 part by weight of a polyester resin (Polyester Adhesive 49000, DuPont), 1 part by weight of the disazo compound No. 1 and 26 parts by weight of tetrahydrofuran were crushed and blended in a ball mill, and the obtained dispersion was coated on an aluminum-evaporated polyester film with a doctor blade and dried for 10 minutes at 100° C. to obtain a photosensitive element of the structure shown in FIG. 1 provided with a photosensitive layer of 7μ.

Subsequently the surface of photosensitive layer of the thus obtained photosensitive element was positively charged by means of a corona discharge of 6 kV for 20 seconds in a commercial testing apparatus for electrostatic copying paper, and the surface potential Vpo (volt) was measured after standing for 20 seconds in the dark. Successively said surface was exposed to the light of a tungsten lamp so that the surface illumination may be 20 lux, and the exposure E1/2 (in lux.sec.) was determined from the time of exposure (in seconds) to reach a surface potential equal to one-half of Vpo. The obtained results were:

Vpo: 650 V
E1/2: 9.8 lux.sec.

EXAMPLES 2 THROUGH 10

The photosensitive elements were prepared by reproducing the process described in the Example 1, except that the disazo compound employed in the Example 1 was replaced respectively by the disazo compounds listed in Table 1. The obtained photosensitive elements were subjected to the measurements identical to those explained in the Example 1 to obtain the results also listed in Table 1.

TABLE 1

| Example | Disazo compd. No. | Vpo (volt) | E1/2 (1 lux.sec.) |
|---|---|---|---|
| 2 | 3 | 700 | 11.5 |
| 3 | 12 | 720 | 9.5 |
| 4 | 15 | 680 | 10.0 |
| 5 | 17 | 650 | 5.4 |
| 6 | 33 | 750 | 14.5 |
| 7 | 42 | 680 | 20.5 |
| 8 | 53 | 700 | 18.5 |
| 9 | 59 | 730 | 25.0 |
| 10 | 62 | 670 | 15.0 |

EXAMPLE 11

10 parts by weight of the same polyester resin as employed in the Example 1, 10 parts by weight of 2,4,7-trinitro-9-fluorenone, 2 parts by weight of the disazo compound No. 1 and 198 parts by weight of tetrahydrofuran were crushed and blended in a ball mill, and the obtained dispersion was coated on an aluminum-evaporated polyester film by a doctor blade, and dried for 10 minutes at 100° C. to obtain a photosensitive element of the structure shown in FIG. 2 provided with a photosensitive layer of a thickness of $10\mu$. Subsequently Vpo and E1/2 of thus obtained photosensitive element were measured in the identical manner as in the Example 1 except that the corona discharge of +6 kV was replaced by that of −6 kV to obtain following results:

Vpo:530 volts
E$\frac{1}{2}$:12.0 lux.sec.

Examples 12 through 20

The photosensitive elements of the structure of FIG. 2 were prepared by reproducing the process described in the Example 11, except that the disazo compound No. 1 was replaced respectively by the disazo compounds listed in Table 2. The obtained photosensitive elements were subjected to the measurements identical to those explained in the Example 11 to obtain results also listed in Table 2.

TABLE 2

| Example | Disazo compd. No. | Vpo (volt) | E1/2 (lux.sec.) |
|---|---|---|---|
| 12 | 4 | 600 | 8.5 |
| 13 | 8 | 620 | 10.5 |
| 14 | 18 | 650 | 18.0 |
| 15 | 25 | 590 | 9.7 |
| 16 | 27 | 580 | 11.0 |
| 17 | 35 | 600 | 7.0 |
| 18 | 49 | 610 | 20.0 |
| 19 | 50 | 600 | 19.5 |
| 20 | 66 | 580 | 19.0 |

Example 21

10 parts by weight of the same polyester resin as employed in the Example 1, 10 parts by weight of 2,5-bis(4-diethylaminophenyl)-1,3,4-oxadiazole, 2 parts by weight of the disazo compound No. 1 and 198 parts by weight of tetrahydrofuran were crushed and blended in a ball mill, and the obtained dispersion was coated on an aluminum-evaporated polyester film with a doctor blade and dried for 10 minutes at 120° C. to obtain a photosensitive element of the structure shown in FIG. 2 with a photosensitive layer of a thickness of $10\mu$. Subsequently the photosensitive element thus obtained was subjected to the measurements identical with those described in the Example 1 to obtain following results:

Vpo:850 volts
E$\frac{1}{2}$:6.2 lux.sec.

Examples 22 through 30

The photosensitive elements of the structure shown in FIG. 2 were prepared by reproducing the process described in the Example 21, except that the disazo compound No. 1 was replaced respectively by the disazo compounds listed in Table 3. The obtained photosensitive elements were subjected to the measurements identical to those described in the Example 1 to obtain results listed in Table 3.

TABLE 3

| Example | Disazo compd. No. | Vpo (volt) | E1/2 (lux.sec.) |
|---|---|---|---|
| 22 | 2 | 900 | 5.5 |
| 23 | 11 | 880 | 8.9 |
| 24 | 13 | 910 | 10.0 |
| 25 | 20 | 1000 | 19.5 |
| 26 | 31 | 900 | 12.0 |
| 27 | 34 | 950 | 9.0 |
| 28 | 45 | 890 | 25.0 |
| 29 | 52 | 910 | 17.0 |
| 30 | 58 | 920 | 19.0 |

Example 31

200 parts by weight of poly-N-vinylcarbazole, 33 parts by weight of 2,4,7-trinitro-9-fluorenone, 20 parts by weight of the polyester resins same as employed in the Example 1 and 20 parts by weight of the disazo compound No. 1 were added to 1780 parts by weight of tetrahydrofuran and crushed in a ball mill. The obtained dispersion was coated on an aluminum-evaporated polyester film with a doctor blade, and dried for 10 minutes at 100° C. and then for 5 minutes at 120° C. to obtain a photosensitive element of a structure shown in FIG. 2 provided with a photosensitive layer of a thickness of $13\mu$. The same measurements as those explained in the Example 1 showed following results:

Vpo:1020 volts
E$\frac{1}{2}$:5.0 lux.sec.

Examples 32 through 40

The photosensitive elements of the structure of FIG. 2 were prepared by reproducing the process described in the Example 31, except that the disazo compound No. 1 was replaced respectively by the disazo compounds listed in Table 3. The obtained photosensitive elements were subjected to the measurements identical with those described in the Example 1 to obtain the results also shown in Table 4.

TABLE 4

| Example | Disazo compd. No. | Vpo (volt) | E1/2 (lux.sec.) |
|---|---|---|---|
| 32 | 6 | 950 | 5.0 |
| 33 | 9 | 1000 | 4.4 |
| 34 | 17 | 980 | 2.9 |
| 35 | 18 | 1100 | 9.8 |
| 36 | 22 | 1000 | 12.5 |
| 37 | 26 | 950 | 6.2 |
| 38 | 38 | 975 | 11.0 |
| 39 | 48 | 1050 | 9.0 |
| 40 | 65 | 950 | 15.3 |

Example 41

2 parts by weight of the disazo compound No. 1 and 98 parts by weight of tetrahydrofuran were crushed and blended in a ball mill, and the obtained dispersion was coated on an aluminum-evaporated polyester film with a doctor blade and dried spontaneously to form a charge carrier generating layer of a thickness of 1μ. Separately 2 parts by weight of 2,4,7-trinitro-9-fluorenone and 2 parts by weight of polycarbonate resin (Teijin Panlite L) were dissolved in 46 parts by weight of tetrahydrofuran, and the resulting solution was coated with a doctor blade on said charge carrier generating layer and dried for 10 minutes at 100° C. to form a charge transfer medium layer of 10μ thickness, thereby obtaining a photosensitive element of a structure as shown in FIG. 3. The photosensitive element thus obtained was subjected to the measurements in the same manner as explained in the Example 1 to obtain the following results:

Vpo:850 volts
E½:11.0 lux.sec.

Examples 42 through 50

The photosensitive elements of the structure of FIG. 3 were prepared by reproducing the process of Example 41, except that the disazo compound No. 1 was replaced respectively by the disazo compounds listed in Table 5, which also show the Vpo and E½ measured on the thus prepared photosensitive elements.

TABLE 5

| Example | Disazo compd. No. | Vpo (volt) | E1/2 (lux.sec.) |
|---------|-------------------|------------|-----------------|
| 42 | 7 | 840 | 9.5 |
| 43 | 19 | 820 | 5.2 |
| 44 | 20 | 800 | 6.5 |
| 45 | 23 | 750 | 5.0 |
| 46 | 31 | 900 | 9.0 |
| 47 | 41 | 910 | 14.5 |
| 48 | 48 | 820 | 12.3 |
| 49 | 57 | 780 | 15.9 |
| 50 | 63 | 850 | 22.5 |

Example 51

2 parts by weight of the disazo compound No. 1 and 98 parts by weight of tetrahydrofuran were blended in a ball mill, and the obtained dispersion was coated with a doctor blade on an aluminum-evaporated polyester film and dried spontaneously to form a charge carrier generating layer of 1μ thickness. Separately 2 parts by weight of 2,5-bis(4-diethylaminophenyl)-1,3,4-oxadiazole and 2 parts by weight of the same polycarbonate resin as employed in the Example 41 were dissolved in 46 parts by weight of tetrahydrofuran, and the resulting solution was coated with a doctor blade on said charge carrier generating layer and dried for 10 minutes at 120° C. to form a charge transfer medium layer of 10μ thickness, thereby obtaining a photosensitive element of a structure as shown in FIG. 3. The obtained photosensitive element was subjected to the measurements in the same manner as described in Example 1 except that a corona discharge of −6 kV was employed instead to obtain the following results:

Vpo:1000 volts
E½:6.0 lux.sec.

Examples 52 through 60

Similar photosensitive elements were prepared by reproducing the process described in the Example 51 except that the disazo compound No. 1 was replaced respectively by the disazo compounds listed in Table 6, which also shows the Vpo and E½ measured on thus prepared photosensitive elements.

TABLE 6

| Example | Disazo compd. No. | Vpo (volt) | E1/2 (lux.sec.) |
|---------|-------------------|------------|-----------------|
| 52 | 6 | 980 | 7.5 |
| 53 | 8 | 1000 | 5.3 |
| 54 | 15 | 975 | 6.0 |
| 55 | 16 | 1050 | 4.0 |
| 56 | 27 | 950 | 10.5 |
| 57 | 29 | 980 | 3.2 |
| 58 | 35 | 970 | 5.0 |
| 59 | 47 | 1000 | 21.0 |
| 60 | 57 | 900 | 19.5 |

Example 61

2 parts by weight of 2,5-bis(4-diethylaminophenyl)-1,3,4-oxadiazole and 2 parts by weight of the same polycarbonate resin as employed in the Example 41 were dissolved in 46 parts by weight of tetrahydrofuran, and the resulting solution was coated with a doctor blade on an aluminum-evaporated polyester film and dried for 10 minutes at 120° C. to form a charge transfer medium layer of 10μ thickness. Separately 2 parts by weight of the disazo compound No. 1, 2 parts by weight of polycarbonate resin and 98 parts by weight of tetrahydrofuran were blended in a ball mill, and the resulting dispersion was coated with a doctor blade on said charge carrier medium layer and dried for 10 minutes at 100° C. to form a charge carrier generating layer of 1μ thickness thereby obtaining a photosensitive element of a laminated structure as shown in FIG. 4.

The obtained photosensitive element was subjected to the measurements in the same manner as in the Example 1 except that there was employed a corona discharge of +6 kV, to obtain the following results:

Vpo:990 volts
E½:5.5 lux.sec.

Examples 62 through 70

Similar photosensitive elements were prepared by reproducing the process described in the Example 61 except that the disazo compound No. 1 was replaced respectively by the disazo compounds listed in Table 7, which also shows the Vpo and E½ measured on said photosensitive elements.

TABLE 7

| Example | Disazo compd. No. | Vpo (volt) | E1/2 (lux.sec.) |
|---------|-------------------|------------|-----------------|
| 62 | 5 | 950 | 14.5 |
| 63 | 10 | 980 | 9.0 |
| 64 | 11 | 950 | 4.0 |
| 65 | 24 | 1000 | 10.0 |
| 66 | 38 | 940 | 20.0 |
| 67 | 55 | 1050 | 15.0 |
| 68 | 56 | 990 | 20.5 |
| 69 | 60 | 1000 | 9.5 |
| 70 | 64 | 950 | 12.0 |

What is claimed is:

1. An electrophotographic material having a high sensitivity as well as a high flexibility, which comprises an electrically conductive support and a photosensitive layer formed thereon, said photosensitive layer consisting essentially of fine particles of disazo pigment having the formula wherein A is selected from the group consisting of is a fused ring selected from the group consisting of benzene ring, halobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and —$COOC_2H_5$; and a resinous binder.

2. An electrophotographic material according to claim 1 wherein the thickness of said photosensitive layer is from 3 to 50 microns, the particle size of said disazo pigment is 5 microns or less and the amount of said disazo pigment is 30-70%, based on the weight of the photosensitive layer.

3. An electrophotographic material according to claim 1 in which A is

4. An electrophotographic material according to claim 1 in which A is

5. An electrophotographic material which comprises an electrically conductive support and a photosensitive layer formed thereon, said photosensitive layer consisting essentially of fine particles of disazo pigment having the formula wherein A is selected from the group consisting of is a fused ring selected from the group consisting of benzene ring, halobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and —$COOC_2H_5$, together with a charge-transfer substance and a resinous binder.

6. An electrophotographic material according to claim 5 wherein the thickness of said photosensitive layer is from 3 to 50 microns, the particle size of said disazo pigment is 5 microns or less, the amount of said disazo pigment is 1-50% and the amount of said charge-transfer substance is 10-95%, based on the weight of the photosensitive layer.

7. An electrophotographic material according to claim 5 in which A is

8. An electrophotographic material according to claim 5 in which A is

9. An electrophotographic material which comprises an electrically conductive support and a charge carrier-generating layer formed thereon, said charge carrier-generating layer consisting essentially of fine particles of disazo pigment having the formula wherein A is selected from the group consisting of and is a fused ring selected from the group consisting of benzene ring, halobenzene ring, naphthalene ring, indole ring, carbazole ring and benzofuran ring; Ar₁ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of Ar₂ and Ar₃ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of R₁ and R₃ is a member selected from the group consisting of hydrogen, methyl, ethyl, phenyl and chlorophenyl; and R₂ is a member selected from the group consisting of methyl, carboxyl and —COOC₂H₅; and a charge-transfer layer on said charge-carrier generating layer, said charge-transfer layer consisting essentially of a charge-transfer substance and a resinous binder.

10. An electrophotographic material according to claim 9 wherein the thickness of said charge carrier-generating layer is 5 microns or less, the thickness of said charge-transfer layer is from 3 to 50 microns, the particle size of said disazo pigment is 5 microns or less and the amount of said charge-transfer substance is 10–95%, based on the weight of said charge-transfer layer.

11. An electrophotographic material according to claim 10 in which A is

12. An electrophotographic material according to claim 10 in which A is

13. An electrophotographic material which comprises an electrically conductive support, a charge-transfer layer on said support, said charge-transfer layer consisting essentially of a charge-transfer substance and a resinous binder, and a charge carrier-generating layer on said charge-transfer layer, said charge carrier-generating layer consisting essentially of fine particles of disazo pigment having the formula wherein A is selected from the group consisting of and is a fused ring selected from the group consisting of benzene ring, halobenzene ring, naphthalene ring, indole ring, carbazole ring and benzofuran ring; Ar₁ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and car- bazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and $-COOC_2H_5$.

14. An electrophotographic material according to claim 13 wherein the thickness of said charge carrier-generating layer is 5 microns or less, the thickness of said charge-transfer layer is from 3 to 50 microns, the particle size of said disazo pigment is 5 microns or less and the amount of said charge-transfer substance is 10-95% by weight, based on the weight of said charge-transfer layer.

15. An electrophotographic material according to claim 13 in which A is

16. An electrophotographic material according to claim 13 in which A is

* * * * *